(12) United States Patent
Wang et al.

(10) Patent No.: US 10,746,604 B2
(45) Date of Patent: Aug. 18, 2020

(54) APPARATUS FOR MEASURING TEMPERATURE OF AERO-ENGINE TURBINE BLADES

(71) Applicant: UNIVERSITY OF ELECTRONIC SCIENCE AND TECHNOLOGY OF CHINA, Chengdu (CN)

(72) Inventors: Chao Wang, Chengdu (CN); Zezhan Zhang, Chengdu (CN); Fei Wang, Chengdu (CN); Chengui Zhang, Chengdu (CN); Jun Hu, Chengdu (CN); Yang Yang, Chengdu (CN); Jing Jiang, Chengdu (CN); Hongchuan Jiang, Chengdu (CN); Yueming Wang, Chengdu (CN); Yuhua Cheng, Chengdu (CN); Jiexiong Ding, Chengdu (CN); Li Du, Chengdu (CN); Houjun Wang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 311 days.

(21) Appl. No.: 15/949,037

(22) Filed: Apr. 9, 2018

(65) Prior Publication Data

US 2018/0348059 A1    Dec. 6, 2018

(30) Foreign Application Priority Data

Jun. 5, 2017    (CN) .......................... 2017 1 0413059

(51) Int. Cl.
*G01J 5/08*    (2006.01)
*G01J 5/06*    (2006.01)
(Continued)

(52) U.S. Cl.
CPC ............... *G01J 5/0806* (2013.01); *G01J 3/36* (2013.01); *G01J 5/0088* (2013.01); *G01J 5/029* (2013.01);
(Continued)

(58) Field of Classification Search
None
See application file for complete search history.

(56) References Cited

U.S. PATENT DOCUMENTS

| 4,433,924 A * | 2/1984 | Quinn, III | G01J 5/522 374/129 |
|---|---|---|---|
| 2004/0119020 A1* | 6/2004 | Bodkin | G01J 3/02 250/353 |
| 2012/0170611 A1* | 7/2012 | Wang | G01J 5/0022 374/121 |

FOREIGN PATENT DOCUMENTS

| JP | 57197415 A | * 12/1982 | ............... G01C 3/24 |

\* cited by examiner

*Primary Examiner* — Edwin C Gunberg
(74) *Attorney, Agent, or Firm* — Matthias Scholl P.C.; Matthias Scholl

(57) ABSTRACT

An apparatus for measuring temperature of turbine blades, including: a radiation collection device, a data processing module; a master control unit (MCU); a calibration module; and a motion servo. The radiation collection device includes a scan reflector, a collimator lens, a first dichroic mirror, a first focus lens, a visible and near-infrared (VNIR) detector, a second dichroic mirror, a second focus lens, a short-wave infrared (SWIR) detector, a third focus lens, and a medium-wave infrared (MWIR) detector. The calibration module includes a calibration reflection mirror and a blackbody furnace. The scan reflector, the collimator lens, the first dichroic mirror, the second dichroic mirror, the third focus lens, and the MWIR detector are disposed successively along a first optical axis; the first dichroic mirror, the first (Continued)

focus lens, and the VNIR detector are disposed successively along a second optical axis that is perpendicular to the first optical axis.

6 Claims, 3 Drawing Sheets

(51) Int. Cl.
| | | |
|---|---|---|
| *G01N 21/27* | (2006.01) | |
| *G01J 5/04* | (2006.01) | |
| *G01J 5/02* | (2006.01) | |
| *G01J 3/36* | (2006.01) | |
| *G01J 5/52* | (2006.01) | |
| *G01J 5/00* | (2006.01) | |
| *G01J 5/60* | (2006.01) | |
| *G01N 21/25* | (2006.01) | |

(52) U.S. Cl.
CPC ............... *G01J 5/047* (2013.01); *G01J 5/06* (2013.01); *G01J 5/0809* (2013.01); *G01J 5/0821* (2013.01); *G01J 5/0865* (2013.01); *G01J 5/522* (2013.01); *G01J 5/602* (2013.01); *G01N 21/274* (2013.01); *G01N 21/253* (2013.01); *G01N 21/255* (2013.01)

APPARATUS FOR MEASURING TEMPERATURE OF AERO-ENGINE TURBINE BLADES

CROSS-REFERENCE TO RELATED APPLICATIONS

Pursuant to 35 U.S.C. § 119 and the Paris Convention Treaty, this application claims foreign priority to Chinese Patent Application No. 201710413059.7 filed Jun. 5, 2017, the contents of which and any intervening amendments thereto are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

This disclosure relates to an apparatus for measuring temperature of turbine blades.

Description of the Related Art

Conventional temperature measuring techniques of turbine blades are of contact type, which means that the measuring tool requires to come into contact with the turbine blades. The shape of the turbine blades is irregular, and the rotation speed thereof can be high, which makes temperature sampling difficult. Accordingly, the measurement results are often inaccurate.

SUMMARY OF THE INVENTION

In view of the above-described problems, it is one objective of the invention to provide an apparatus that accurately measures the temperature of aero-engine turbine blades.

To achieve the above objective, in accordance with one embodiment of the invention, there is provided an apparatus for measuring temperature of turbine blades, which comprises: a radiation collection device, a data processing module; a master control unit (MCU); a calibration module; and a motion servo. The radiation collection device comprises a scan reflector, a collimator lens, a first dichroic mirror, a first focus lens, a visible and near-infrared (VNIR) detector, a second dichroic mirror, a second focus lens, a short-wave infrared (SWIR) detector, a third focus lens, and a medium-wave infrared (MWIR) detector. The calibration module comprises a calibration reflection mirror and a blackbody furnace.

The scan reflector, the collimator lens, the first dichroic mirror, the second dichroic mirror, the third focus lens, and the MWIR detector are disposed successively along a first optical axis; the first dichroic mirror, the first focus lens, and the VNIR detector are disposed successively along a second optical axis that is perpendicular to the first optical axis; the second dichroic mirror, the second focus lens, and the SWIR detector are disposed successively along a third optical axis that is perpendicular to the first optical axis and parallel to the second optical axis; the calibration reflection mirror is disposed between the scan reflection mirror and the collimator lens, and is located in the first optical axis; the black body is disposed at one side of the first optical axis; and a radiation emitted from the blackbody furnace is reflected by the calibration reflection mirror and then incident on the collimator lens; the data processing module acquires and analyzes data from the VNIR detector, the SWIR detector and the MWIR detector; the data processing module transmit a command to the MCU based on analysis results; and the MCU controls the motion servo to focus the collimator lens.

In a class of this embodiment, the apparatus further comprises a spectrometer, a filter wheel, a beam splitter, a fourth focus lens, and a switch control. The beam splitter is disposed between the collimator lens and the first dichroic mirror, and is located in the first optical axis; the beam splitter, the fourth focus lens and the spectrometer are disposed successively along a fourth optical axis that is perpendicular to the first optical axis; the filter wheel is disposed between the second focus lens and the SWIR detector, and is located in the fifth optical axis that is perpendicular to the first optical axis; the switch control is controlled by the MCU; and the filter wheel comprises a plurality of filters.

In a class of this embodiment, the SWIR detector and the MWIR detector are provided with filters, respectively.

In a class of this embodiment, the scan reflector is disposed in a tube; the tube comprises a first end located in an engine case of a turbine and a second end out of the engine case of the turbine; the first end is provided with an optical aperture corresponding to the scan reflector; the second end of the tube communicates with the radiation collection device via a transparent window disposed therebetween to seal the radiation collection device; and the second end of the tube comprises an air hole, and cold air enters the tube via the air hole to sweep and clean the tube and the scan reflector.

Advantages of the apparatus for measuring temperature of turbine blades are summarized as follows. The apparatus makes full use of the spectrum analysis theory to select an ideal window for temperature measurement, thus eliminating the radiation attenuation caused by gas absorption and improving the temperature measurement accuracy. The focusing and the precise regulation of the probe are achieved by controlling the canning servo and focusing servo to constantly change the azimuth of the optical scan reflector. In addition, the apparatus adjusts the focus to adapt the distance change between the target point and the optical lens. Therefore, the apparatus is always within the focus on the curved blade surface, to collect the most radiation of different regional points for temperature measurement.

BRIEF DESCRIPTION OF THE DRAWINGS

The invention is described hereinbelow with reference to the accompanying drawings, in which.

DETAILED DESCRIPTION OF THE EMBODIMENT

For further illustrating the invention, experiments detailing an apparatus for measuring temperature of turbine blades are described below. It should be noted that the following examples are intended to describe and not to limit the invention.

Figure 1:
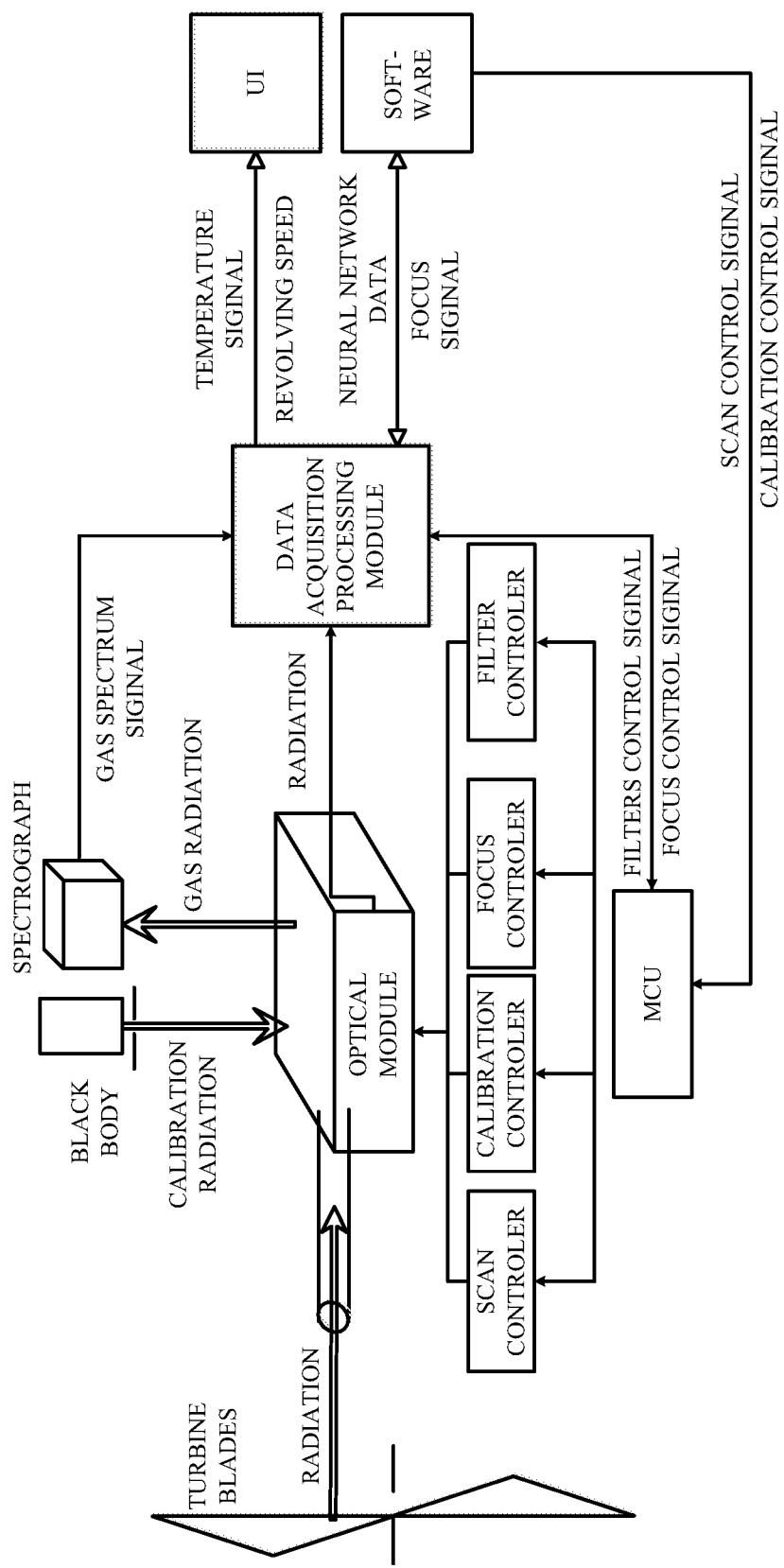
FIG. 1 is a module structure of an apparatus for measuring temperature of turbine blades according to the disclosure.
Figure 2:
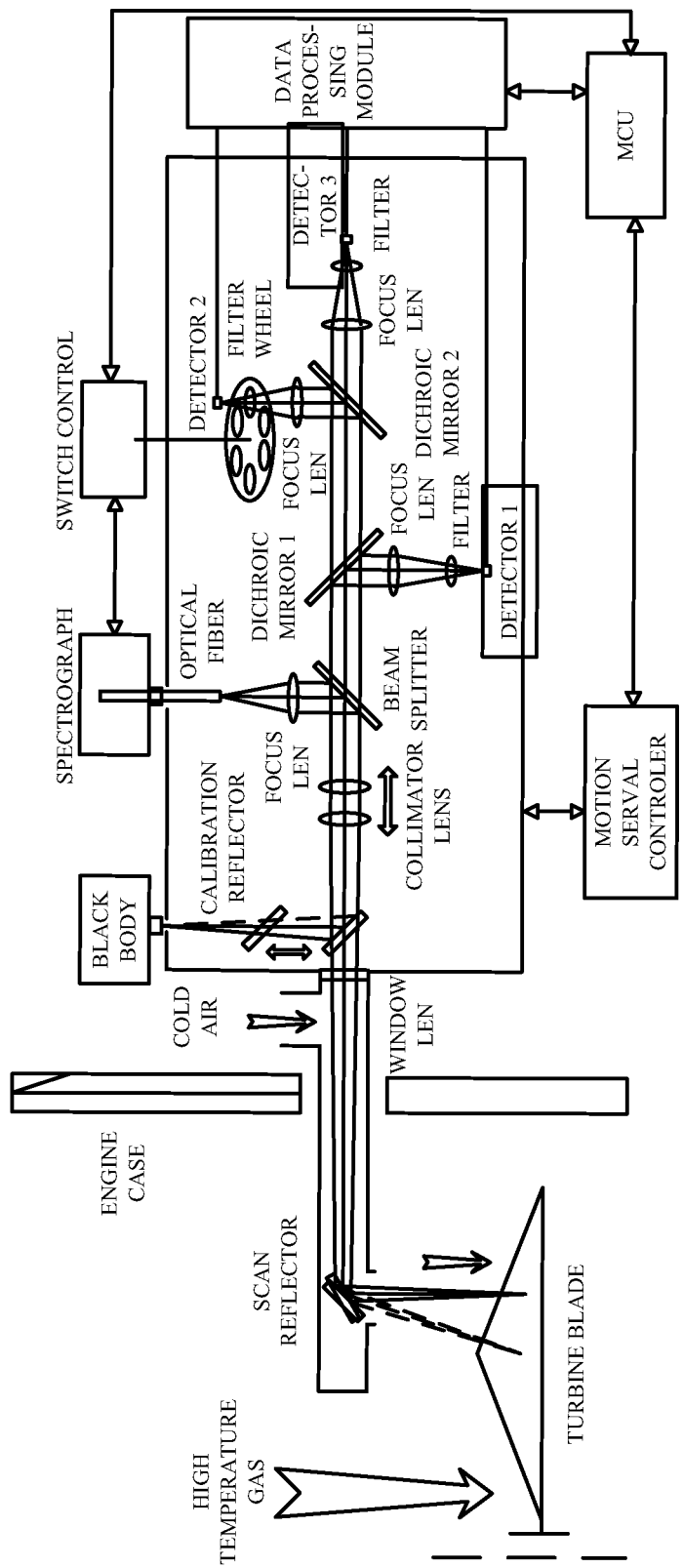
FIG. 2 is a functional schematic diagram of an apparatus for measuring temperature of turbine blades according to the disclosure.

The overall function of the apparatus for measuring temperature of turbine blades is shown in FIG. 2. The optical probe near the turbine blade is made of high temperature alloy to ensure the function and stabilization of the scan reflector. At the top of the probe, a rotatable mirror is mounted to reflect the radiation into the optical path of the probe. The circuit module digitizes the electronic output (analog signal) of the detector and transfers the digital signals to the processor of the console, for data acquisition and display. The scan reflector is rolled by a stepper motor, ball screw and planetary motor. The cold air inlet is introduced to the probe to prevent the scan reflector from being contaminated by the combustion particulates in the high temperature gas.

The apparatus for measuring temperature of turbine blades comprises: a radiation collection device, a data processing module; a master control unit (MCU); a calibration module; and a motion servo. The radiation collection device comprises a scan reflector, a collimator lens, a first dichroic mirror, a first focus lens, a visible and near-infrared (VNIR) detector, a second dichroic mirror, a second focus lens, a short-wave infrared (SWIR) detector, a third focus lens, and a medium-wave infrared (MWIR) detector. The calibration module comprises a calibration reflection mirror and a blackbody furnace.

The scan reflector, the collimator lens, the first dichroic mirror, the second dichroic mirror, the third focus lens, and the MWIR detector are disposed successively along a first optical axis; the first dichroic mirror, the first focus lens, and the VNIR detector are disposed successively along a second optical axis that is perpendicular to the first optical axis; the second dichroic mirror, the second focus lens, and the SWIR detector are disposed successively along a third optical axis that is perpendicular to the first optical axis and parallel to the second optical axis.

The calibration reflection mirror is disposed between the scan reflection mirror and the collimator lens, and is located in the first optical axis; the black body is disposed at one side of the first optical axis; and a radiation emitted from the blackbody furnace is reflected by the calibration reflection mirror and then incident on the collimator lens.

The data processing module acquires and analyzes data from the VNIR detector, the SWIR detector and the MWIR detector; the data processing module transmit a command to the MCU based on analysis results; and the MCU controls the motion servo to focus the collimator lens.

Furthermore, the apparatus further comprises a spectrometer, a filter wheel, a beam splitter, a fourth focus lens, and a switch control. The beam splitter is disposed between the collimator lens and the first dichroic mirror, and is located in the first optical axis; the beam splitter, the fourth focus lens and the spectrometer are disposed successively along a fourth optical axis that is perpendicular to the first optical axis; the filter wheel is disposed between the second focus lens and the SWIR detector, and is located in the fifth optical axis that is perpendicular to the first optical axis; the switch control is controlled by the MCU; and the filter wheel comprises a plurality of filters. To avoid the infrared light absorption band of gas, the MCU rolls the filter wheel to select an appropriate filter according to the gas spectral information detected by the spectrograph.

Furthermore, the SWIR detector and the MWIR detector are provided with filters, respectively.

Furthermore, the scan reflector is disposed in a tube; the tube comprises a first end located in an engine case of a turbine and a second end out of the engine case of the turbine; the first end is provided with an optical aperture corresponding to the scan reflector; the second end of the tube communicates with the radiation collection device via a transparent window disposed therebetween to seal the radiation collection device; and the second end of the tube comprises an air hole, and cold air enters the tube via the air hole to sweep and clean the tube and the scan reflector.

Figure 3:
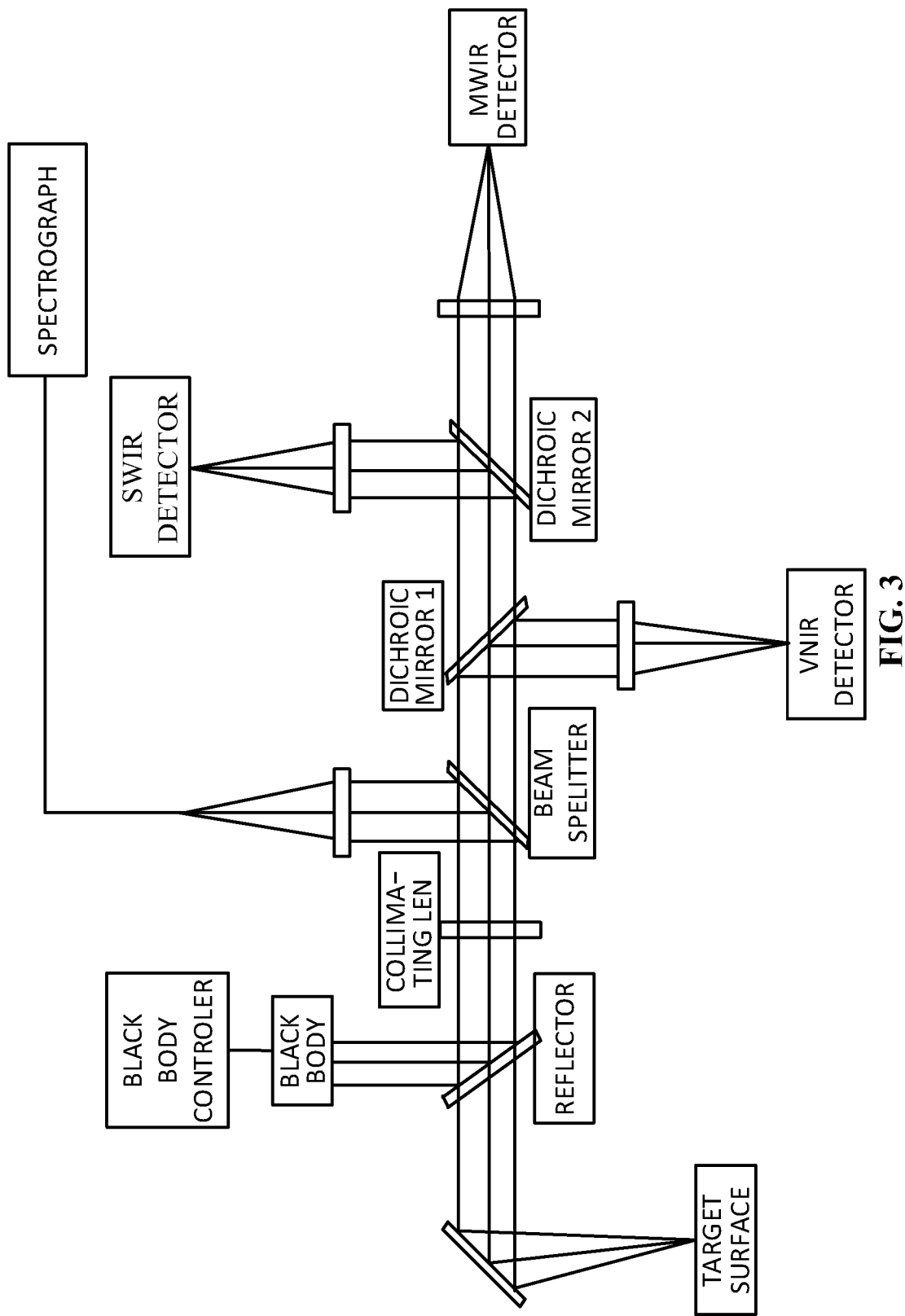
FIG. 3 is an optical path diagram of an apparatus for measuring temperature of turbine blades according to the disclosure.

The following sections detail the main parts:

Because the temperature of turbine blades ranges from 400° C. to 1550° C., and according to Planck's blackbody radiation law, the temperature measuring wavelengths are divided into three bands: visible-near infrared (VNIR: 0.4-1 μm), short-wave infrared (SWIR: 1-3 μm) and medium-wave (MWIR: 3-5 μm). As the optical path structure shown in FIG. 3, the radiation from the turbine blades is reflected by a scan reflector into the optical probe through the combustion gas and is collimated into parallel light by the collimator lens. Through the first dichroic mirror and the second dichroic mirror, the main radiation is divided into three wide spectral bands that are VNIR, SWIR and MWIR, the three spectral bands radiation are respectively focused by different lens and are then detected by the related photo-electric detectors.

The gaseous $H_2O$ and $CO_2$ have the strong absorption of infrared radiation in the short-wave infrared band (1-3 μm), and the main components of the high temperature gas are $H_2O$ and $CO_2$, so the apparatus is provided with a spectrometer to detect the absorption spectrum of the high temperature gas. According to the absorption spectrum of the high temperature gas (such as strong absorption area near 1.4 μm, 1.9 μm and 2.7 μm), the wavelength of selected filters should be at the wavelength whose transmission rate is near 1 (such as 1.6 μm and 2.2 μm), therefore the error caused by the absorption can be ignored. Different wavelength bands of infrared radiation energy can be selected by switching the filter wheel.

In the process of calculating the turbine blade temperature, the interference from background radiation and combustion spikes is reduced by the three-band temperature measurement algorithm. In addition, the accuracy can be enhanced by using the blackbody calibration. For the purpose of obtaining the blade surface temperature distribution, the apparatus adjusts the scan reflector to measure all the regions of the whole blade, so the temperature map of all the blades can be made. At the same time, according to the gas spectrum analyzed by spectrograph, the apparatus selects the adjustable window out of the gas absorption area.

In order to obtain the temperature information of the whole turbine blades, it is necessary to measure the different regions on the turbine blade by point to point. Therefore, there is a need to use the optical probe to scan the different points on the turbine blades by changing the angle of the scan reflector, so that the collimator lens collects the radiation at different points on the turbine blades in turn. In the process of point-by-point scanning, the points on the turbine blades have different distance from the collimator lens due to the structural characteristics of the turbine blades, thus the probe is out of focus, and the accuracy of radiation measurement will be adversely affected.

Therefore, while the optical probe is scanning the turbine blade surface, the working distance of the collimator lens needs a real-time adjustment, so that the focal point is always on the curving surface of turbine blades. First, the distances between every point of blade and collimator lens could be calculated, at the range of 80-120 mm, based on every point's distance, an adjustment database for controlling servo motor to adjust the focus length of collimator lens could be built. At the first measure point on the blade, an initial adjustment is given for this first point by the database. At the second point, the collimator lens adjusts the object distance to keep the target point is always at the focal point, so on and so forth. In this way, the apparatus always measures the radiation of the real blade surface.

In addition, the apparatus has the blackbody calibration function, as shown in FIG. 2. The calibration reflector is out of the optical path when it is out of work. When the apparatus needs calibration, the calibration reflector is inserted into the main optical path to turn the optical path toward the blackbody side. Then the temperature of the cold and hot blackbody is set according to ambient temperature, so this apparatus can collect the blackbody radiation, and to get calibration parameters by Planck formula. After calibration, the calibration reflector will be removed from the main path, and the optical path is turned back to measure the turbine blade temperature. The accuracy of the apparatus will be improved according to the calibration parameters. With the calibrated apparatus, the radiation brightness and temperature of the turbine blades are calculated according to Planck formula.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An apparatus for measuring temperature of turbine blades, the apparatus comprising:
  a radiation collection device, the radiation collection device comprising a scan reflector, a collimator lens, a first dichroic mirror, a first focus lens, a visible and near-infrared (VNIR) detector, a second dichroic mirror, a second focus lens, a short-wave infrared (SWIR) detector, a third focus lens, and a medium-wave infrared (MWIR) detector;
  a data processing module;
  a master control unit (MCU); and
  a calibration module, the calibration module comprising a calibration reflection mirror and a blackbody furnace; and
  a motion servo;
wherein:
  the scan reflector, the collimator lens, the first dichroic mirror, the second dichroic mirror, the third focus lens, and the MWIR detector are disposed successively along a first optical axis;
  the first dichroic mirror, the first focus lens, and the VNIR detector are disposed successively along a second optical axis that is perpendicular to the first optical axis;
  the second dichroic mirror, the second focus lens, and the SWIR detector are disposed successively along a third optical axis that is perpendicular to the first optical axis and parallel to the second optical axis;
  the calibration reflection mirror is disposed between the scan reflection mirror and the collimator lens, and is located in the first optical axis; the black body is disposed at one side of the first optical axis; and a radiation emitted from the blackbody furnace is reflected by the calibration reflection mirror and then incident on the collimator lens;
  the data processing module acquires and analyzes data from the VNIR detector, the SWIR detector and the MWIR detector; the data processing module transmit a command to the MCU based on analysis results; and
  the MCU controls the motion servo to focus the collimator lens.

2. The apparatus of claim 1, further comprising a spectrometer, a filter wheel, a beam splitter, a fourth focus lens, and a switch control;
wherein:
  the beam splitter is disposed between the collimator lens and the first dichroic mirror, and is located in the first optical axis;
  the beam splitter, the fourth focus lens and the spectrometer are disposed successively along a fourth optical axis that is perpendicular to the first optical axis;
  the filter wheel is disposed between the second focus lens and the SWIR detector, and is located in the fifth optical axis that is perpendicular to the first optical axis;
  the switch control is controlled by the MCU; and
  the filter wheel comprises a plurality of filters.

3. The apparatus of claim 1, wherein the SWIR detector and the MWIR detector are provided with filters, respectively.

4. The apparatus of claim 2, wherein the SWIR detector and the MWIR detector are provided with filters, respectively.

5. The apparatus of claim 1, wherein:
  the scan reflector is disposed in a tube;
  the tube comprises a first end located in an engine case of a turbine and a second end out of the engine case of the turbine;
  the first end is provided with an optical aperture corresponding to the scan reflector;
  the second end of the tube communicates with the radiation collection device via a transparent window disposed therebetween to seal the radiation collection device; and
  the second end of the tube comprises an air hole, and cold air enters the tube via the air hole to sweep and clean the tube and the scan reflector.

6. The apparatus of claim 2, wherein:
  the scan reflector is disposed in a tube;
  the tube comprises a first end located in an engine case of a turbine and a second end out of the engine case of the turbine;
  the first end is provided with an optical aperture corresponding to the scan reflector;
  the second end of the tube communicates with the radiation collection device via a transparent window disposed therebetween to seal the radiation collection device; and
  the second end of the tube comprises an air hole, and cold air enters the tube via the air hole to sweep and clean the tube and the scan reflector.

* * * * *